(12) United States Patent
Rizzo

(10) Patent No.: US 12,356,057 B1
(45) Date of Patent: Jul. 8, 2025

(54) COVERT VIDEO CAMERA HOUSING

(71) Applicant: John Rizzo, Parkland, FL (US)

(72) Inventor: John Rizzo, Parkland, FL (US)

( * ) Notice: Subject to any disclaimer, the term of this patent is extended or adjusted under 35 U.S.C. 154(b) by 0 days.

(21) Appl. No.: 18/888,817

(22) Filed: Sep. 18, 2024

(51) Int. Cl.
*H04N 23/51* (2023.01)
*G03B 17/56* (2021.01)

(52) U.S. Cl.
CPC ........... *H04N 23/51* (2023.01); *G03B 17/561* (2013.01)

(58) Field of Classification Search
CPC ............................. H04N 23/51; G03B 17/561
See application file for complete search history.

(56) References Cited

U.S. PATENT DOCUMENTS

| | | | |
|---|---|---|---|
| 7,236,200 B2 | 6/2007 | Vernon | |
| 9,405,173 B1 * | 8/2016 | Okunami | F16M 11/18 |
| 10,016,083 B1 | 7/2018 | Atieh | |
| 11,209,120 B1 | 12/2021 | Bronson | |
| 11,330,155 B1 * | 5/2022 | Pawar | H04R 3/005 |
| 11,860,517 B2 | 1/2024 | Aonuma | |
| 2012/0113646 A1 | 5/2012 | Carmody | |
| 2016/0091779 A1 * | 3/2016 | Jodoin | G03B 17/563 396/428 |
| 2017/0131718 A1 * | 5/2017 | Matsumura | H04N 23/11 |
| 2017/0142374 A1 | 5/2017 | Berg | |
| 2019/0219899 A1 * | 7/2019 | Vega | G03B 17/02 |
| 2020/0351474 A1 | 11/2020 | Gaudiano Del Bosque et al. | |
| 2021/0190488 A1 * | 6/2021 | Weisenburger | H04N 23/50 |
| 2021/0258492 A1 * | 8/2021 | Renke | H04N 23/54 |

FOREIGN PATENT DOCUMENTS

| | | |
|---|---|---|
| CN | 108305340 A | 7/2018 |
| CN | 111317335 A | 6/2020 |
| CN | 211019053 U | 7/2020 |
| CN | 111928077 B | 12/2021 |
| JP | 4858839 B2 | 1/2012 |
| WO | 2008/068499 A1 | 6/2008 |

OTHER PUBLICATIONS

Amazon NOVOLINK Printed Jun. 25, 2024 https://www.amazon.com/NOVOLINK-Landscape-Camera-Viewing-Activated/dp/B0BMPVHN92/ref=sr_1_1?crid=2TAIOMCK2YRQB&dib=eyJ2IjoiMSJ9.pioSpTjpVvlTp2vv53Cjb6bsl4t6ly0BZmlYr-OGkfc-Ud5c_cm36_hECtDHSy0XcgZ5D8opfl4Tjt6Ep68S6rpCwKFw9qpFXtr8HmJdR_wO1LXqhL_RqbBMeYJiMS1dl6Ooolgi.
Zetronix Atom Printed Jun. 25, 2024 https://www.zetronix.com/1080p-hd-dvr-nanny-cam-d-i-y-self-install-kit-hidden-camera.html.

* cited by examiner

*Primary Examiner* — Amy R Hsu
(74) *Attorney, Agent, or Firm* — DANIEL S. POLLEY, P.A.

(57) ABSTRACT

A covert video camera housing preferably for outdoor use where the video camera is not easily seen and does not distract or negatively affect the aesthetics of the area where the video camera is located. In one embodiment, an ordinary pole is provided, and the video camera is located within the pole and able to record events happening in the area through an opening in the pole. In a second embodiment, a pole adaptor is secured to a top end of an existing pole and camera is located within the pole adaptor and records through an opening provided in the pole adaptor.

22 Claims, 13 Drawing Sheets

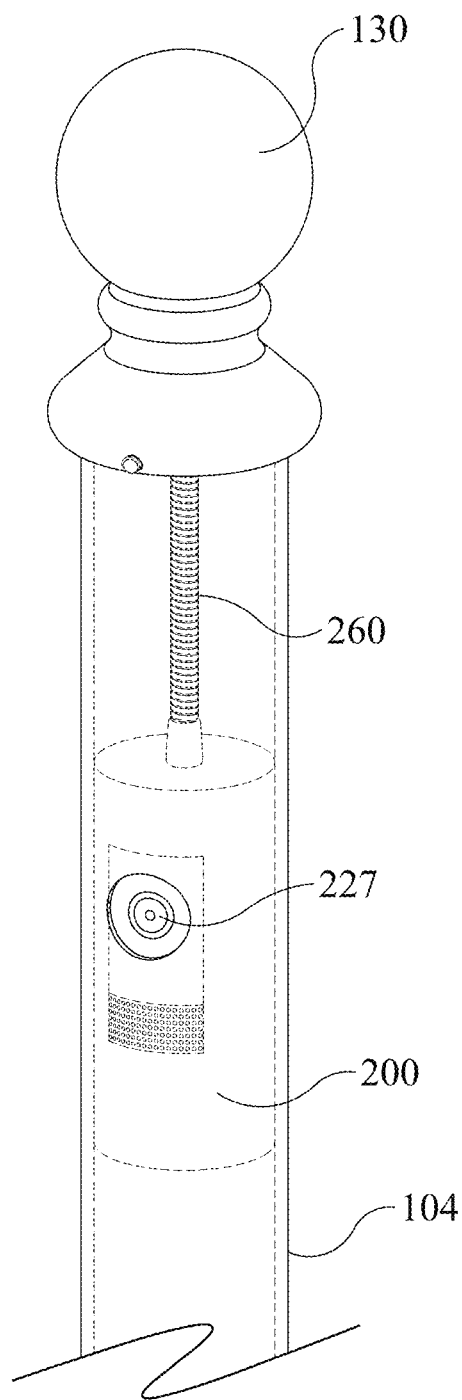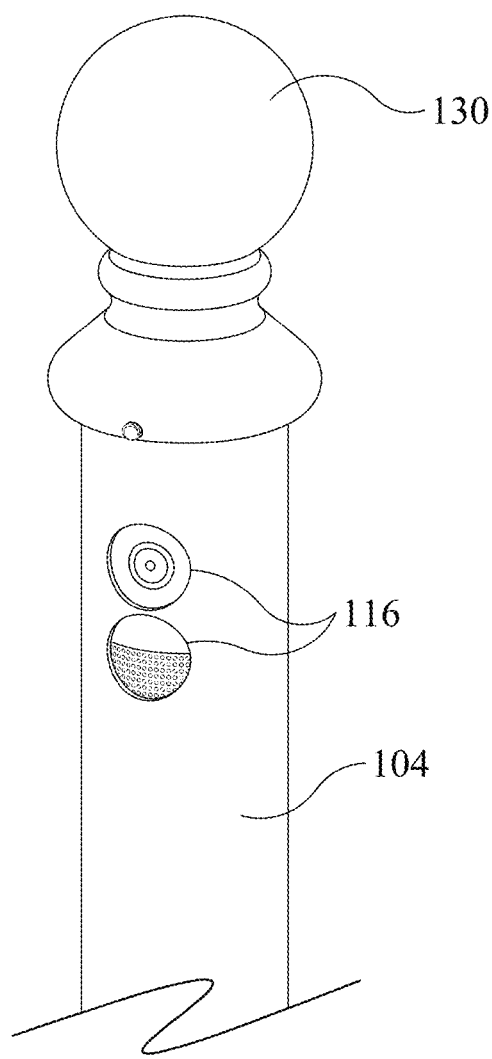
FIG. 5
FIG. 6

US 12,356,057 B1

COVERT VIDEO CAMERA HOUSING

FIELD OF THE DISCLOSURE

The disclosure relates generally to video camera housing and more particularly to a cover video camera housing.

BACKGROUND OF THE DISCLOSURE

Video cameras, including surveillance cameras, are ubiquitous and typically are secured such that the video camera is easily visible. Often the video camera negatively affects the aesthetics of the area where it is located. In other situations, the user or owner of the video camera may prefer that the video camera is not easily visible. Accordingly, what is needed is a housing for the video camera which allows the video camera to remain covert (i.e. not easily seen) during use and which does not negatively distract from the aesthetics of the area where the video camera is secured. The disclosed novel covert video camera housing is directed to overcoming both of these shortcomings presently experienced with the use of current video cameras.

SUMMARY OF THE INVENTION

A novel covert video camera housing which preferably can accommodate a variety of video camera models and form facts. In a preferred, non-limiting embodiment, the housing can be shaped as a common outdoor pole, used in a variety of outdoor settings, such as, but not limited to, a light pole, a mailbox pole, fence pole, flagpole, etc. The pole can be provided with one or more openings and the video camera suspended or secured inside the pole preferably from the top or a cap member of the pole such that the camera is aligned with the opening. Thus, the disclosed novel covert video camera housing allows the video camera to record events happening in the area around the pole, while remaining covert and not easily seen as it remains disposed internally within the ordinary looking pole housing preferably at all times during use. Though not considered limiting, the preferred camera housing can accommodate a plurality of cameras within the pole (e.g. two cameras, etc.), as well as solar panel mounted or secured to the pole and disposed on the outside of the pole for charging of a battery member for the video camera(s) located within the pole. Accordingly, as the user can install a camera of their choice within the actual pole, the aesthetics of the pole remain basically as a pole, not as a pole having a visible video camera secured or mounted to the pole creating an unsightly look.

As opposed to a new pole having the opening for the internal, it may not be practical or desired to use a new pole with a hole, but also impractical to drill or create a hole in an existing outside pole at the location. To address this additional concern, in another non-limiting embodiment, a pole adaptor can be provided preferably having a sleeve member at a bottom end which can receive the top end of the existing outside pole to secure the pole adaptor to the existing outside pole. The pole adaptor can be provided with one or more holes for the internal camera to see out of, such that no holes for the camera are required to be made in the existing outside pole. The cap member for the existing outside pole can then be placed on the top end of the pole adaptor and the video camera can be camera secured or suspended from the top end of the pole adaptor or the cap member secured to the top end of the pole adaptor causing the video camera to be located internally within the pole adaptor and aligned with the opening(s) in the pole adaptor for the video camera.

Accordingly, in all embodiments, the novel covert video camera housing provides for a covert video camera (preferably for outdoor use, though such is not considered limiting), while not negatively effecting the aesthetics of the area where the video camera is to be located.

BRIEF DESCRIPTION OF DRAWINGS

FIG. 5 is a partial sectional view of the embodiment seen in FIG. 1 showing the video camera suspended internally within in accordance with the present disclosure;

FIG. 6 is a perspective view of the embodiment seen in FIG. 1 with different shaped openings in the pole as compared to the opening in the pole seen in FIG. 1;

DETAILED DESCRIPTION OF THE INVENTION

Figure 1:
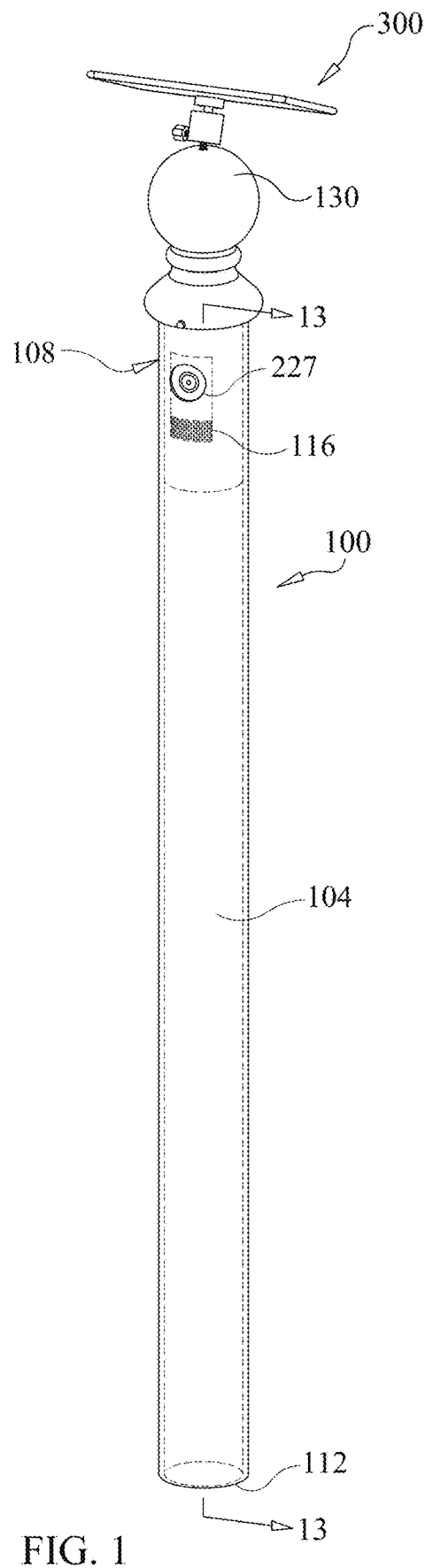
FIG. 1 illustrates a perspective view of a first embodiment for the covert video camera housing in accordance with the present disclosure.

As seen in FIGS. 1, 2, 5, 6 and 13 a first, non-limiting embodiment for the novel covert video camera housing is seen and generally designated as covert housing 100. Covert housing 100 can be provided with a body member 104 having a top or first end 108, preferably an open top or first end, and a bottom or second end 112, which can also be an open bottom or second end. A cutout, hole, opening, etc. (collectively "opening" hereinafter) designated as opening 116 can be provided or defined by body member 104. Preferably body member 104 can be in the shape of a common pole, and preferably a common cylindrical shaped pole. However, such shape is not considered limiting and body member 104 can also have other non-pole shapes, such as, but not limited to, the shape of other objects commonly found outside, which are also considered within the scope of the disclosure. Additionally, where body member 104 is in the shape of a common pole, the shape is not considered limited to a cylindrical shape, and other shapes, such as, but not limited to, square, rectangular, quadrilateral, trapezoidal, hexagonal, etc. can also be used and are also considered within the scope of the disclosure. However, for purposes of discussing the non-limiting examples of the various embodiments for the novel covert video camera housing, the pole and pole adaptor will be described and shown in a non-limiting cylindrical or circular shape.

A cap member 130 can also be provided and can be preferably secured at top or first end 108 of body member 104. In one non-limiting removable securement embodiment and hole or aperture 118 can be provided near or adjacent to the edge of top end 108 and a similar hole or aperture 134 can be provided on cap member 130. Preferably, apertures 118 and 134 can be threaded. When securing cap member 130 to top end 108, cap member 130 can have a bottom opening/receiving area 138 (preferably centrally located-See FIG. 19) for receiving top end 108 of body member 104 to allow apertures 118 and 134 to be aligned. Once apertures 118 and 134 are aligned, a set screw or bolt 150 or other preferably threaded fastener can be screwed or positioned in within apertures 118 and 134 to securely fasten cap member 130 to body member 104 (though cap member 130 can be removed and/or unfastened by removing screw 150). Alternatively or additionally, the width of receiving 138 can be slightly larger than the outer diameter width at top end 108 of body member 104 to allow for tight fit when top end 108 is inserted within receiving area 138, such that the screw 150 and apertures 118/134 or other fastening/securement mechanism may not be needed.

Figure 2A:
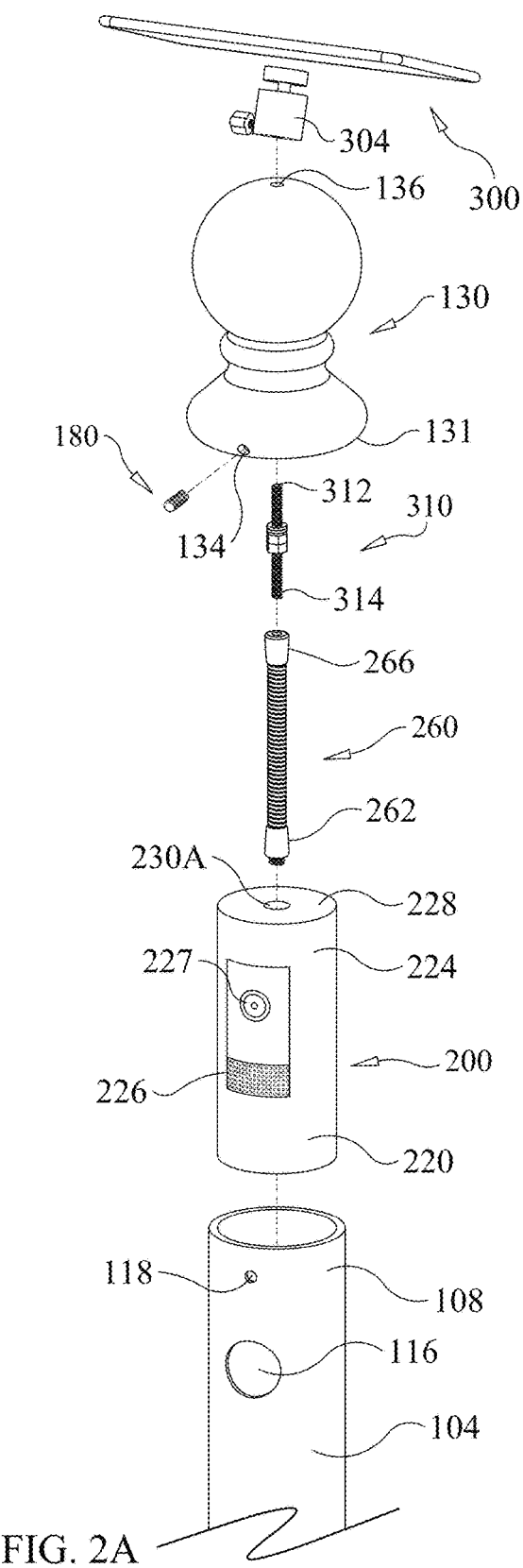
FIG. 2A is an exploded perspective view of the embodiment seen in FIG. 1.
Figure 2B:
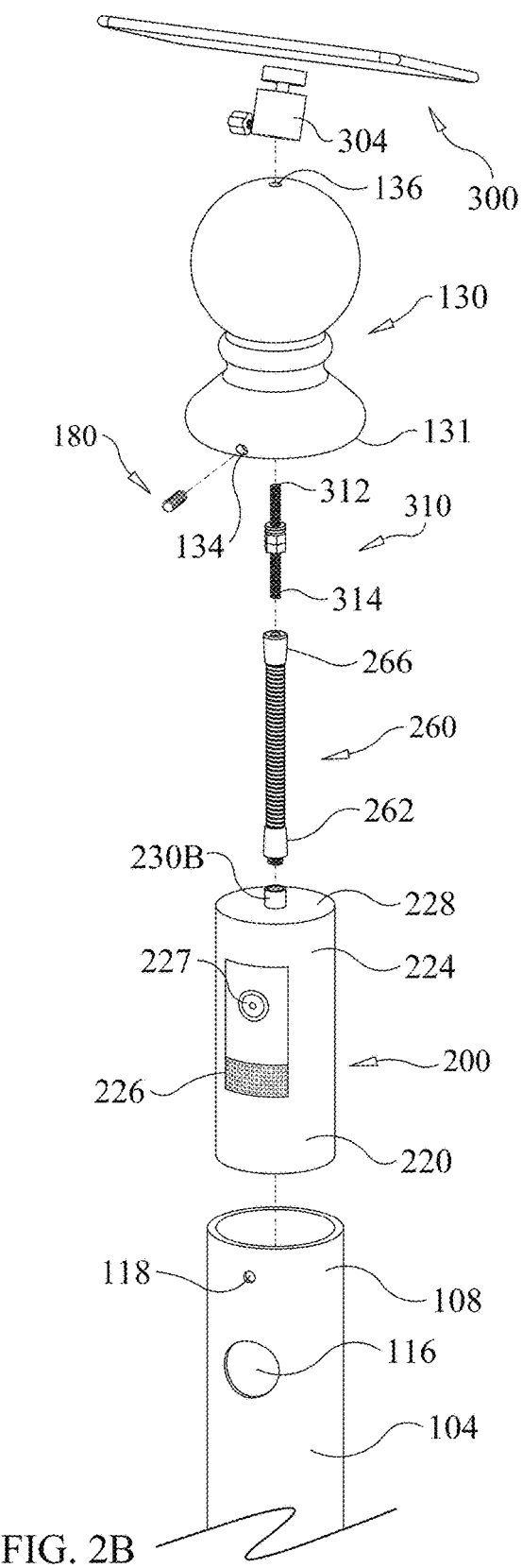
FIG. 2B is an exploded perspective view of the embodiment seen in FIG. 1 showing a female adaptor having a preferably threaded opening/receiving area and protruding upward from the top of the camera housing, as an alternative to having an internal threaded opening/receiving area within the housing body of the camera as seen in FIG. 2A.
Figure 3:
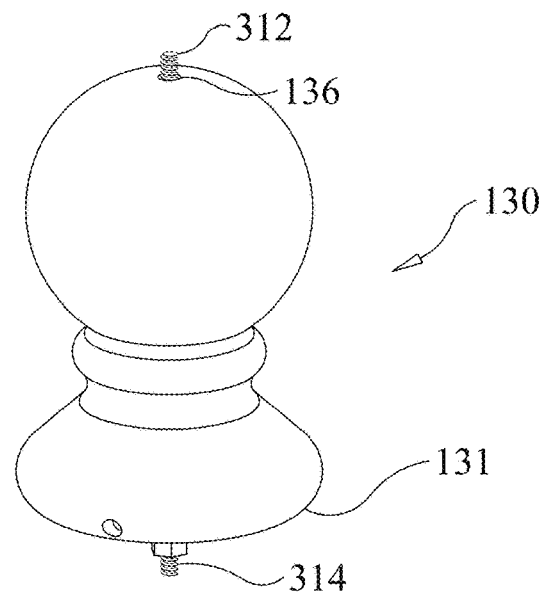
FIG. 3 is a perspective of a non-limiting cap member that can be disposed at a top end of all embodiments of the covert video camera housing in accordance with the present disclosure.
Figure 4:
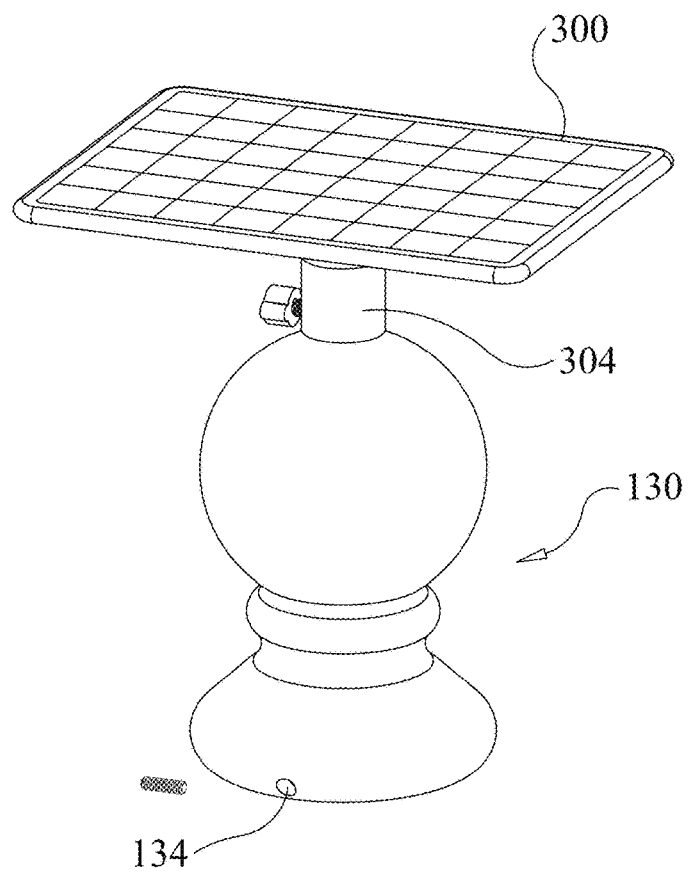
FIG. 4 is a perspective of the non-limiting cap member seen in FIG. 3 shown with a solar panel secured to a portion (preferably top portion) of the cap member in accordance with the present disclosure.
Figure 7:
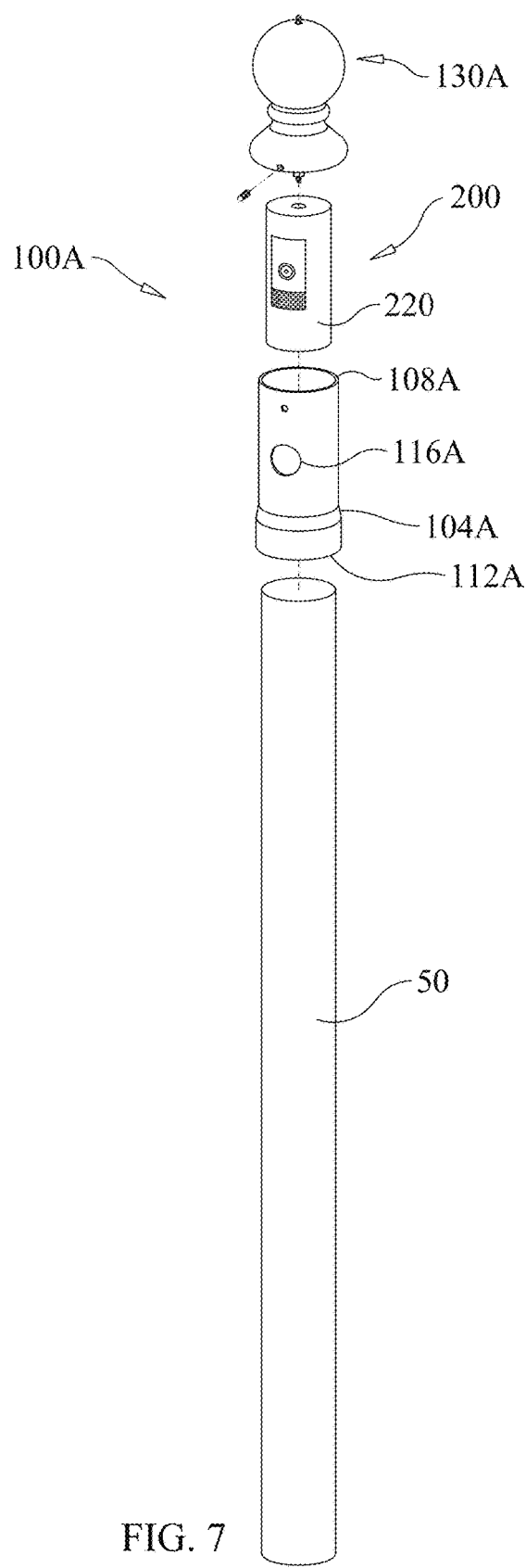
FIG. 7 is an exploded perspective view of a second embodiment for the covert video camera housing in accordance with the present disclosure.
Figure 8:
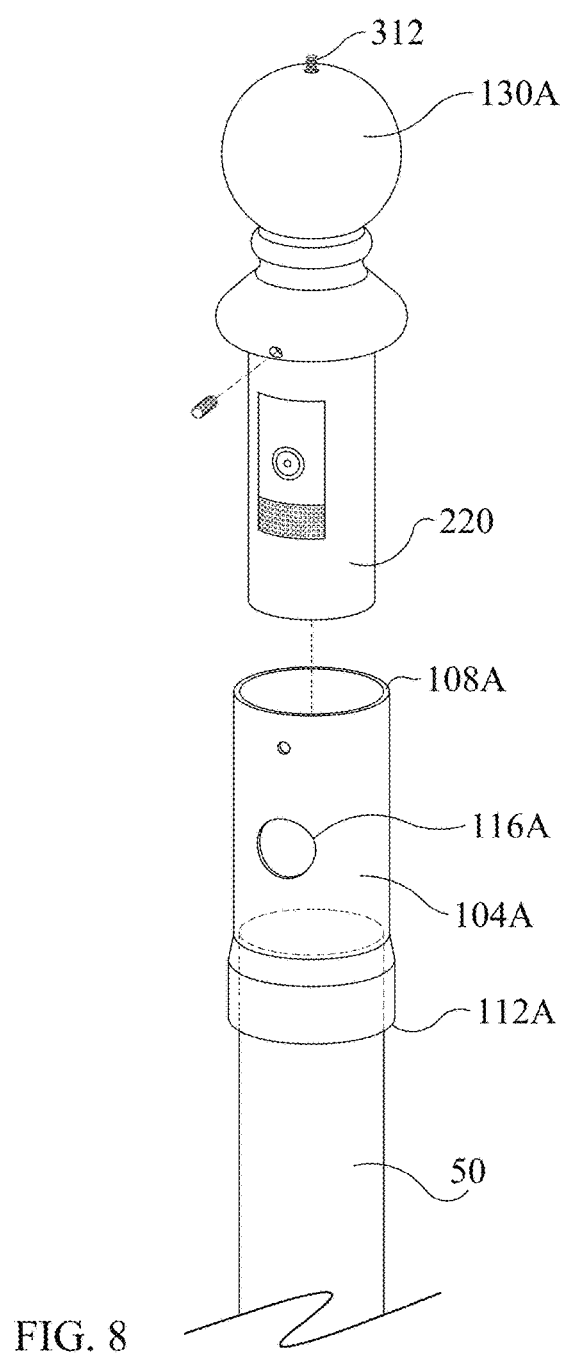
FIG. 8 is a partial exploded perspective view of the embodiment seen in FIG. 7 showing the pole adaptor member secured to an existing pole in accordance with the present disclosure.

As seen in FIG. 2 a video camera 200 (which can be any conventional or later developed surveillance camera) can include a housing member 220 having a wall 224 that defines an opening 226 where the camera lens 227 is aligned with such that wall 224, nor body member 104, does not block video camera 200 from properly recording. A first or top end 228 of internal housing member 220 can be primarily closed and can be provided with a female adaptor 230 (preferably threaded) or can be provided with a relatively small cutout 230A which can be preferably threaded for receipt of a lower or male end 262 first end of a flexible rod 260.

Figure 19:
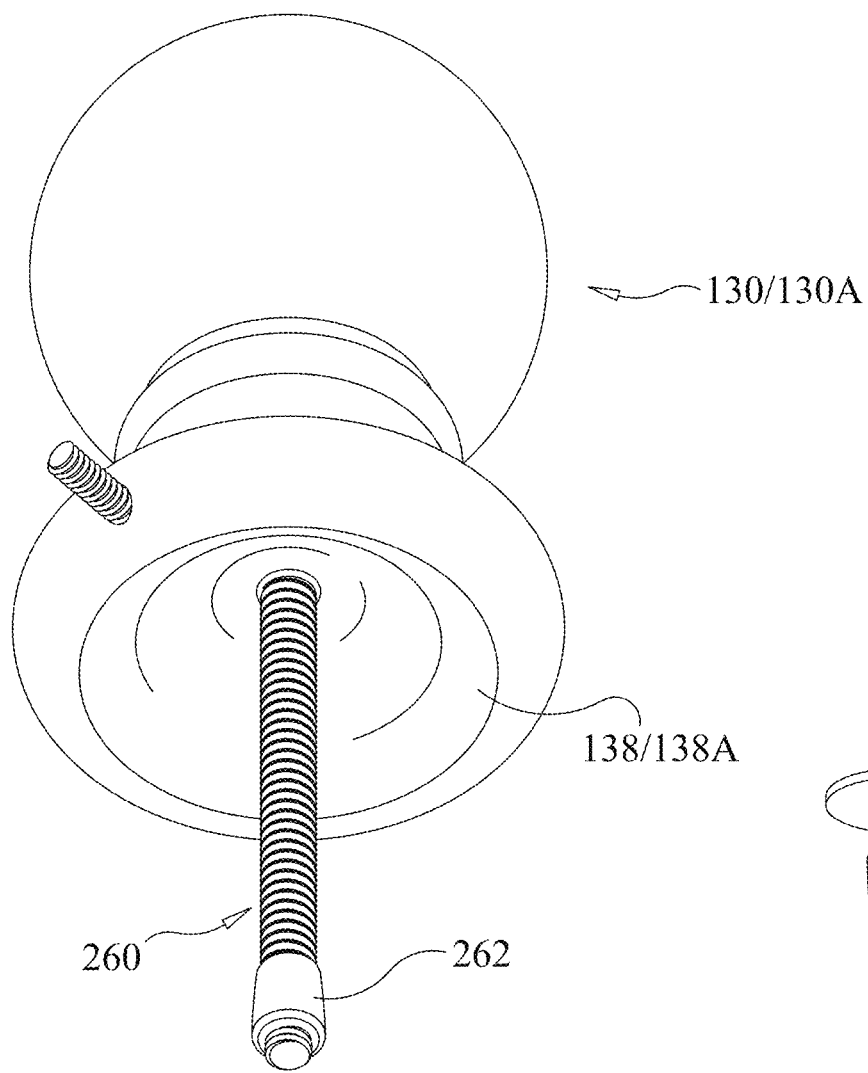
FIG. 19 is a bottom perspective view of a cap member illustrating its pole receiving area that can be used with any of the embodiments in accordance with the present disclosure.
Figure 20:
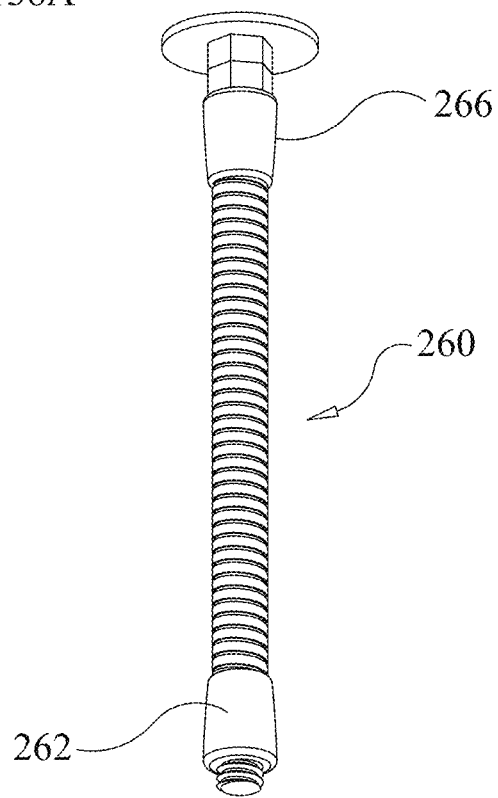
FIG. 20 is a perspective view of a non-limiting flexible rod that can be used in all embodiments and where the rod is disposed within the cap member which does not include or have a solar panel secured to its top area, end of the flexible rod which is disposed internally within the cap member can be plugged or otherwise closed with one example shown in FIG. 20.

An upper or female receiving end 266 of flexible rod 260 can be of disposed internally within cap member 130 and secured therein. As seen in FIG. 19, with all embodiments of the invention, female receiving end 266 of flexible rod 260 can be positioned within an internal area of cap member 130. Though FIG. 2 shows a solar panel 300 secured to the top of cap member 130. However, it should be recognized that a solar panel 300 can be secured to cap member 130 in all of the disclosed embodiments, whether or not shown in the drawings and such is considered within the scope of the disclosure. Similarly, though certain embodiments shown in the drawings show a solar panel 300 with cap member 130, it is also within the scope of the disclosure that in all embodiments no solar panel is provided or secured to cap member 130. As seen in FIG. 19 flexible rod 260 can be secured partially within cap member 130 preferably by using cement 360, though other conventional securement mechanisms, adhesives, tapes, fasteners, etc. can also be used and are also considered within the scope of the disclosure. Where cement 360 is used for securing rod 260, preferably once cement 360 has dried and hardened it can be painted or otherwise colored and can be painted to match the color of cap member 130, though such is not considered limiting. As seen in FIG. 20 where no solar panel 300 is secured to cap member a plug/male adaptor/insert or other insertable object 370 can be secured to flexible rod 260 through mating at female receiving area 266 of rod 260, though the use of plug/male adaptor/insert/object 370 is considered optional.

Where a solar panel 300 is secured to cap member 130 (such as in FIG. 2), an opening or aperture 136 (preferably threaded) can be provided preferably in a top area of cap member 130 for receipt of one end 312 of bolt 310 which can extend through opening 136 and protrude out of cap member 130 and be available for securement to an attachment base 304 of solar panel 300. The opposite end 314 of bolt 310 is disposed internally within cap member 130 and is received by receiving end 266 of flexible rod 260 (preferably threadedly received) to secure flexible rod 260 to bolt 310. Though flexible rod 260 can be securely retained in position with respect to cap member 130 through the indirect securement of flexible rod 260 to solar panel attachment base 304 through bolt 310, it is preferred, but not considered limiting, to further secure flexible rod 260 in position with cement 360 or another fastener, similar to as described above where no solar panel 300 is provided.

Figure 21:
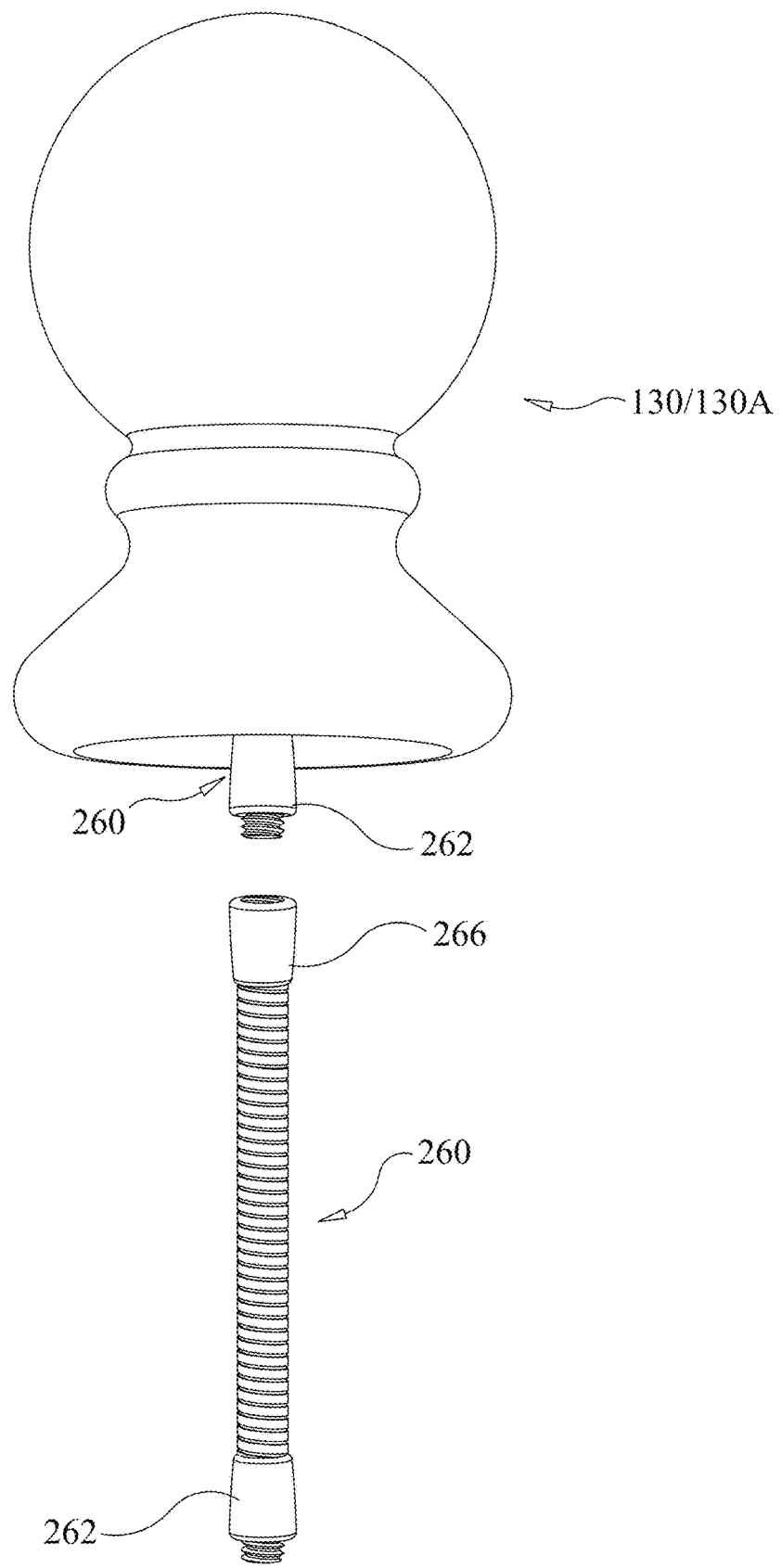
FIG. 21 is a side view of a cap member that can be used in all embodiments which does not have a solar panel secured to a top area and showing one end of the flexible rod, such as but not limited to the flexible rod of FIG. 20, extending outward from the bottom of cap member and available for use in securing a video camera internally within the pole or pole adaptor in accordance with the present disclosure.

As seen in FIG. 21, when flexible rod 260 is properly secured to cap member 130, male end 262 extends downward a distance preferably below a lower edge 131 of cap member 130 where male end 262 is available for securement to internal housing member 220 or to a female receiving member 266 of another flexible rod 260 (i.e. where video camera 200 is required to extend lower (i.e. further away from cap member 130) within pole body member 104 based on the location of opening 116 of body member 104. As seen in FIG. 1 and FIG. 5, when assembled, camera 220 is suspended from or other secured to cap member 130 or a top area of pole body member 104 internally within body member 104 and lens 227 is aligned with opening 116. Accordingly, though video camera 220 is covertly located within body member 104 and not easily seen or visible, it is unobstructed by body member 104 and can capture and record events occurring in the area of covert housing 100.

The bottom end 112 of body member can secured to the ground, another object or to a base member similar to how any other common outside pole is normally secured outside. Additionally, legs, anchors or other supports can be provided and secured to body member 104 preferably at or adjacent to bottom end 112 for maintaining covert housing 100 in a correct position (i.e. vertical, etc.).

All necessary electronics, digital storage, battery (ies), recharging ports, wired or wireless communication technology, etc. that is normally provided with a video camera or surveillance video camera can be included and preferably housed/contained within video camera housing 220 or as normally housed, stored or located with common video cameras. Where provided, solar panel 300 can be provided for providing power for video camera 200 and/or for recharging a conventional rechargeable battery that can be provided for powering video camera 200.

Additionally, the shape of opening 116 in body member 104 is not limited to any particular shape. Rather, opening 116 should be sufficient in size such that lens 227 of video camera 200 is unobstructed and preferably video camera 200 is not restricted or prevented from its normal recording area or range. Thus, in FIG. 1, opening 116 is shown as rectangular in shape, while in FIG. 2 opening 116 is shown as circular in shape, and such shapes are not considered limited and other shapes for opening 116 can also be used and are considered within the scope of the disclosure.

Additionally, as seen in FIG. 6, a plurality of openings 116, such as, but not limited to, two openings 116 can be provided adjacent to each other in body member 104 to provide for (in this non-limiting example) two vertical heights levels for video camera 220 and aligning lens 227 internally within body member 104. Furthermore, the length of flexible rod 260 is not considered limited to any specific one dimension and multiple size flexible rods 260 can be provided to allow a user to customize and have available a specific length needed for how low video camera 200 should be positioned internally within body member 104 and distanced from cap member 130 or a top end of body member 104. Depending on the distance chosen, one flexible rod 260 may be sufficient or a plurality of flexible rods (of the same length or of differing lengths) may be needed to be connected together and all combinations and configurations are considered within the scope of the disclosure.

FIG. 7-FIG. 12 and FIG. 14 illustrate a second, non-limiting, embodiment for the covert video camera housing which is generally designated as covert housing/adaptor 100A and preferably for use with an existing ordinary pole 50 (mailbox pole, fence pole, flagpole, other existing pole, etc.) already at the location. Though not required, covert housing 100A can be used in situations where an opening cannot be easily made in existing pole 50 or the user would prefer not to create a hole in existing pole 50. Thus, rather than providing a new pole/body member 104, a sleeve body 104A can be provided and has first or top end 108A and a second or bottom end 112A. A sleeve portion 113A can be located at bottom end 112A and can be slightly larger in inner diameter than an outer diameter size of a top end 52 of the existing ordinary pole 50, such that top end 52 becomes a male mating member that is received within sleeve portion 113A to secure cover housing 100A to existing pole 50 (See FIG. 14). The opposite top end 108A of covert housing 100A functions similar to top end 108 for the housing 100 embodiment and the description of cap member 130, flexible rods 260, solar panel 300, etc. are also applicable to the second embodiment where covert housing/adaptor 100A is provided. Covert housing 100A can be provided with an opening 116A, similar to the description for opening 116, and an opening 118A for securement with a cap member 130A.

Cap member 130A can be preferably secured at top or first end 108A of a body member 104A of covert housing/adaptor 100A. Hole or aperture 118A can be provided near or adjacent to the edge of top end 108A and a similar hole or aperture 134A can be provided on cap member 130A. Preferably, apertures 118A and 134A can be threaded. When securing cap member 130A to top end 108A, cap member 130A can have a bottom opening/receiving area 138A which can be similar or the same to bottom opening/receiving area 138 for receiving top end 108A of body member 104A to allow apertures 118A and 134A to be aligned. Once apertures 118A and 134A are aligned, a set screw or bolt 150A or other preferably threaded fastener can be screwed or positioned in within apertures 118A and 134A to securely fasten cap member 130A to body member 104A (though cap member 130A can be removed and/or unfastened by removing screw 150A).

Figure 9:
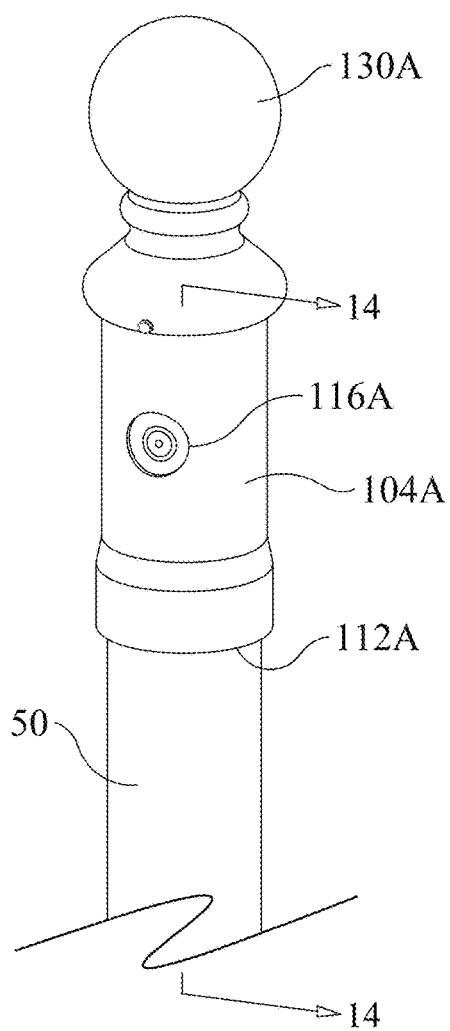
FIG. 9 is an assembled perspective view of the embodiment seen in FIG. 7.
Figure 10:
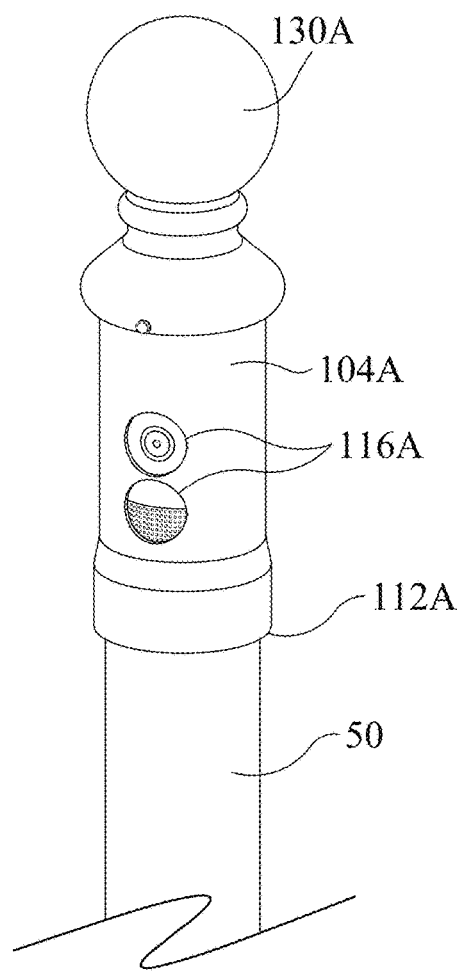
FIG. 10 is an assembled perspective view of the embodiment seen in FIG. 7 but with a plurality of adjacent pole openings instead of the single pole opening.

Video camera 200 is internally disposed within body member 104A such that the camera lens 227 is aligned with opening 116A in body member 104A (See FIG. 9 and FIG. 10). As such body member 104A does not block video camera 200 from properly recording. First or top end 228 of internal housing member 220 of camera 200 can be primarily closed and can be provided with a female adaptor 230 (preferably threaded) or can be provided with a relatively small cutout 230A which can be preferably threaded for receipt of a lower or male end 262 first end of a flexible rod 260 or bolt 310.

An upper or female receiving end 266 of flexible rod 260 can be of disposed internally within cap member 130A and secured therein, similar to or the same as described with the securement of cap member 130. Though FIG. 7-FIG. 12 shows a solar panel 300 secured to the top of cap member 130A, it is also within the scope of the disclosure that no solar panel is provided or secured to cap member 130A.

Where a solar panel 300 is secured to cap member 130A, an opening or aperture 136A (preferably threaded) can be provided preferably in a top area of cap member 130A for receipt of one end 312A of bolt 310A which can extend through opening 136A and protrude out of cap member 130A and be available for securement to attachment base 304 of solar panel 300. The opposite end 314A of bolt 310A can be disposed internally within cap member 130A and is received by receiving end 266 of flexible rod 260 (preferably threadedly received) to secure flexible rod 260 to bolt 310 or directly to the female adaptor or top hole in camera housing 220.

Figure 14:
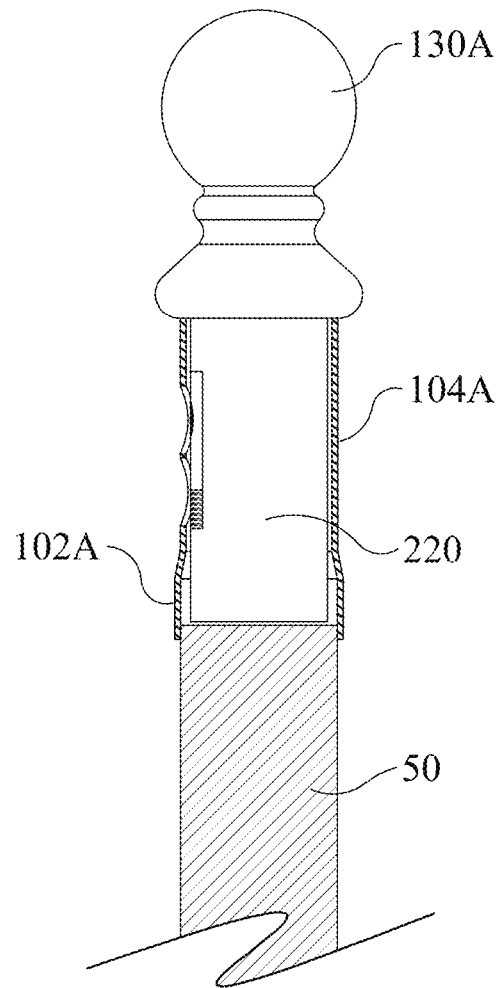
FIG. 14 is a side sectional view of the assembled embodiment seen in FIG. 9 taken along lines 14-14.

As seen in FIG. 14, opening 116A in body member 104A, may be close enough to cap member 130A such that no flexible rod 260 is needed and camera housing can be secured directly to end 312A of bolt 310A. However, it is also within the scope of the disclosure where opening 116A is located lower down on body member 104A where a flexible rod 260 may be needed to suspend camera 200 and align camera lens 227 with opening 116A. With cover housing 100A video camera 200 is covertly located within body member 104A and not easily seen or visible and is not obstructed by body member 104A so that camera 200 can capture and record events occurring in the area of covert housing 100A.

Additionally, the shape of opening 116A in body member 104A is not limited to any particular shape. Rather, opening 116A should sufficient in size such that lens 227 of video camera 200 is unobstructed and preferably video camera 200 is not restricted or prevented from its normal recording area or range. Additionally, as seen in FIG. 10, a plurality of openings 116A, such as, but not limited to, two openings 116A can be provided adjacent to each other in body member 104 to provide for (in this non-limiting example) two vertical heights levels for video camera 220 and aligning lens 227 internally within body member 104A. Furthermore, the length of flexible rod 260 is not considered limited to any specific one dimension and multiple size flexible rods 260 can be provided to allow a user to customize and have available a specific length needed for how low video camera 200 should be positioned internally within body member 104A and distanced from cap member 130A or a top end of body member 104A. Depending on the distance chosen, one flexible rod 260 may be sufficient or a plurality of flexible rods (of the same length or of differing lengths) may be needed to be connected together and all combinations and configurations are considered within the scope of the disclosure.

Figure 11:
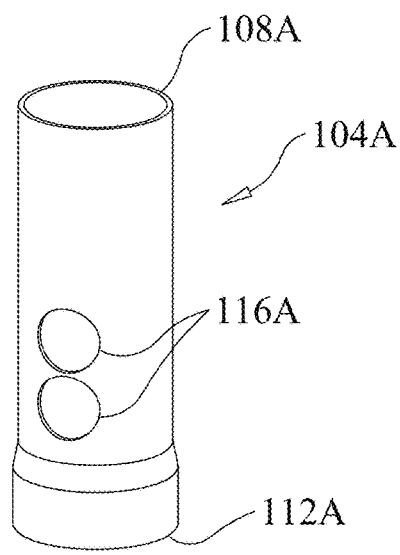
FIG. 11 is a perspective of the pole adaptor member for the embodiment seen in FIG. 7 showing a plurality of adjacent lower pole openings.
Figure 12:
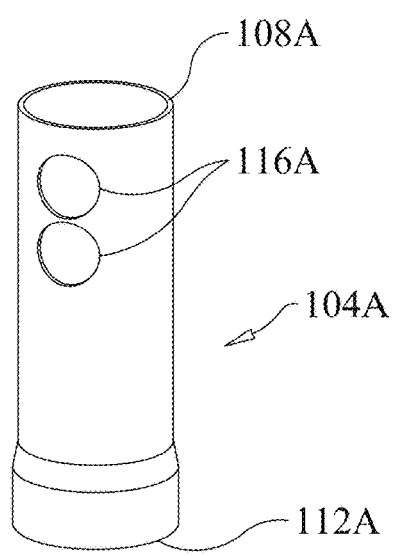
FIG. 12 is a perspective of the pole adaptor member for the embodiment seen in FIG. 7 showing a plurality of adjacent upper pole openings, where, though not limiting, the pole adaptor can be provided with one or more lower pole openings and one or more upper pole openings and house a plurality of video cameras (e.g. 2 cameras, etc.) within the pole adaptor in accordance with the present disclosure.
Figure 13:
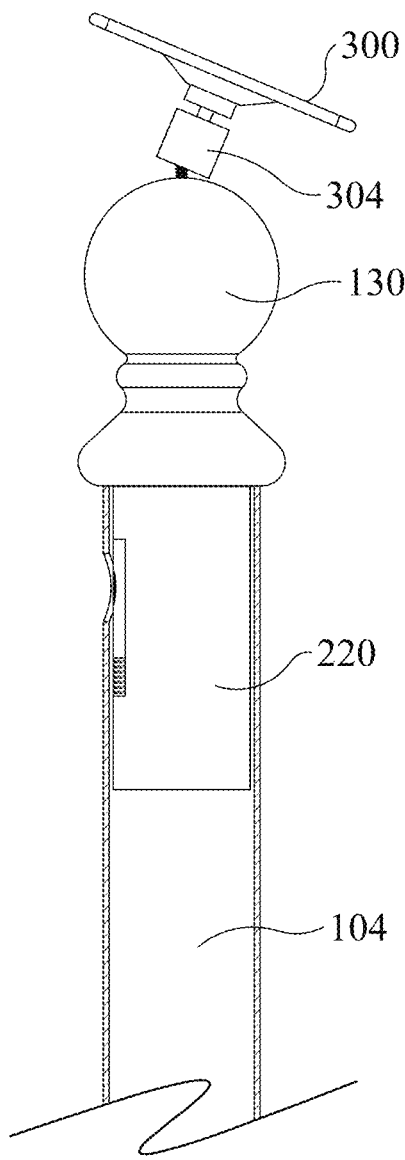
FIG. 13 is a side sectional view of the assembled embodiment seen in FIG. 1 taken along lines 13-13.

Furthermore, as seen in FIG. 11 and FIG. 12, the same body member 104A is shown having both lower openings 116A and upper openings 116A, which can be located on opposite area/sides of body member 104A (though such is not considered limiting). In this scenario, two video cameras 200 can be provided with a first camera 200 aligned with one of the lower openings 116A and a second camera 200 aligned with one of the upper openings 116 such that the cameras can provide coverage or surveillance in more than one direction (i.e. 360-degree coverage, etc.). Using multiple cameras 200 and having multiple openings in the body member can be provided with all of the embodiments disclosed herein.

In all embodiments, when using two or more cameras within body member, the cameras can be directly connected to each other, with one camera preferably below the other camera (though not considered limiting) or one camera can be suspending from a higher positioned camera such as by using one or more flexible rods. The positioning of multiple cameras in the housing is not considered limited to any one specific securement mechanism and any securement mechanism can be used and considered within the scope of the disclosure.

Figure 15:
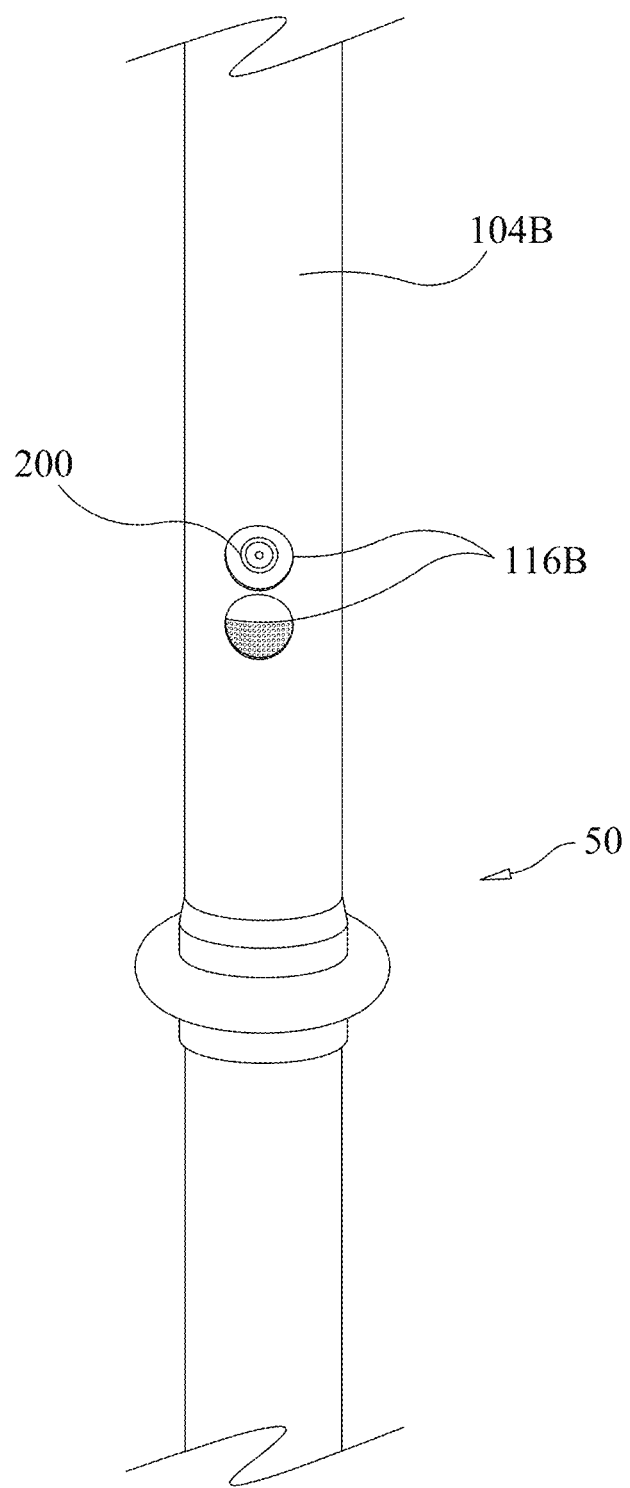
FIG. 15 is a close-up view of a portion of the third embodiment for the novel covert video camera housing where the video camera is disposed within an existing pole and internally aligned with an opening made to the existing pole in accordance with the present disclosure.
Figure 16:
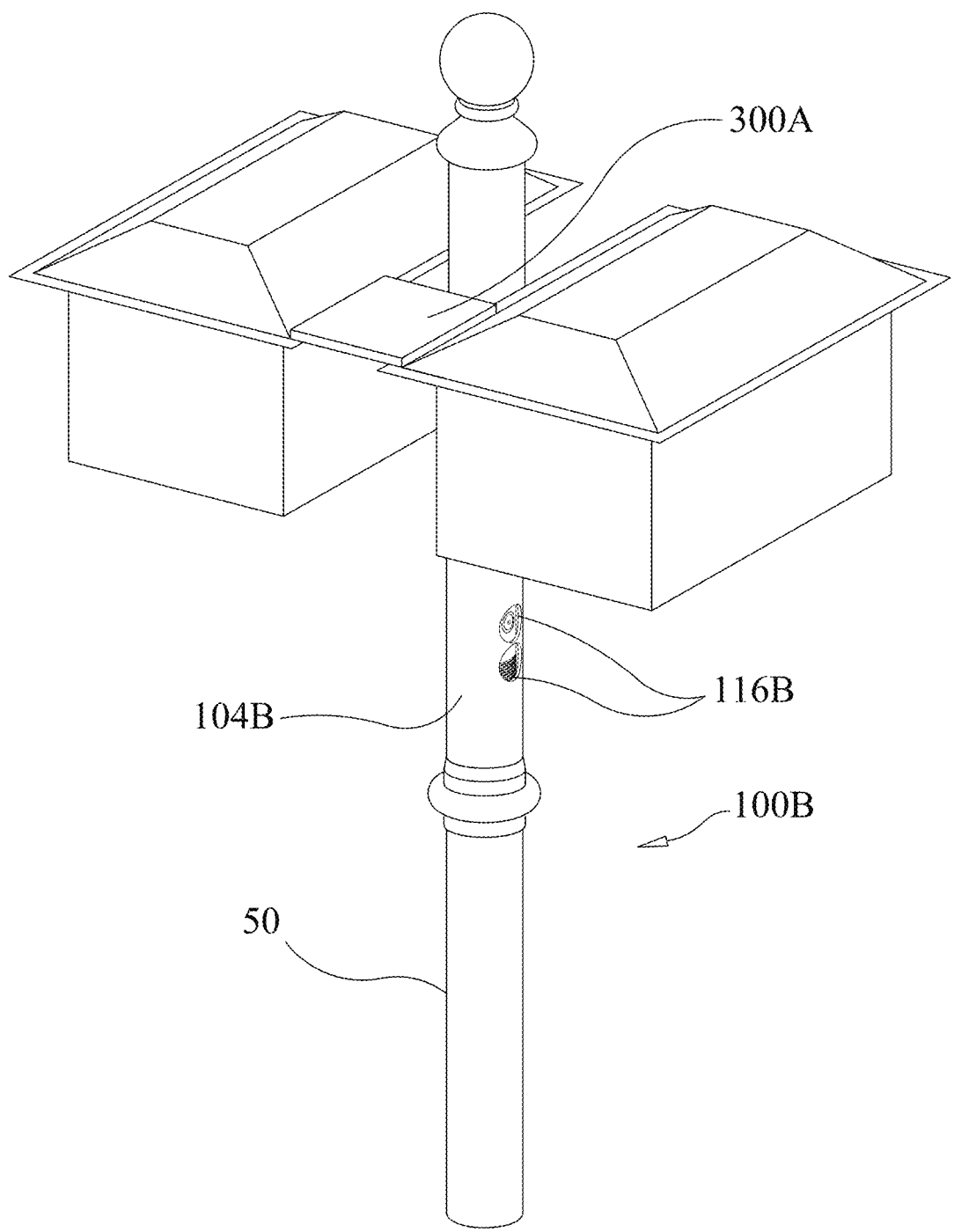
FIG. 16 is a perspective of the embodiment partially seen in FIG. 15 being used as a mailbox pole and with one or more cameras disposed within the pole and visible (though still difficult to see) from only a few angles when looking at the mailbox.
Figure 17:
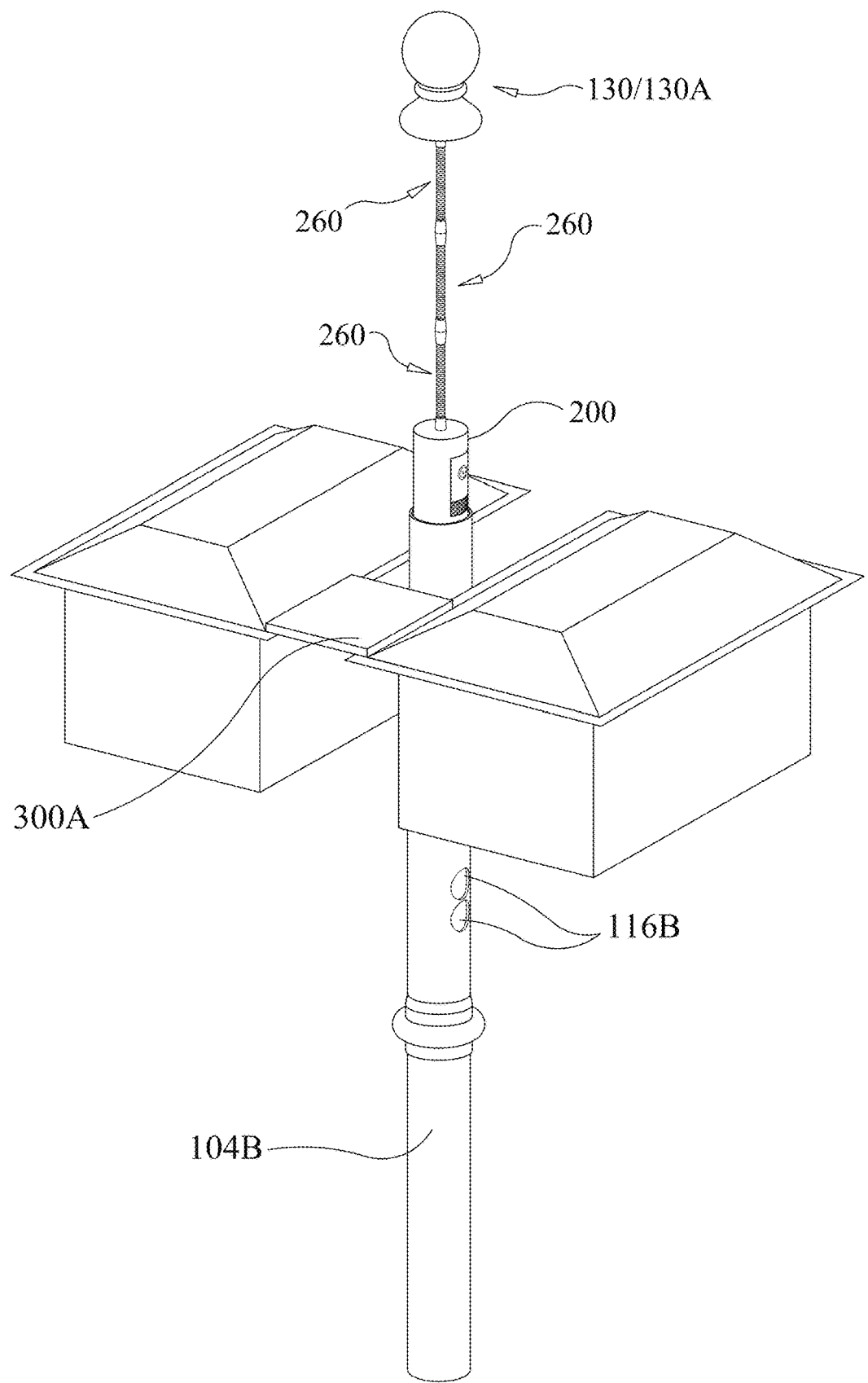
FIG. 17 is a perspective exploded view illustrating an extended rod to allow for the camera to be disposed at a greater distance away from the top member of the pole/pole adaptor or the cap member in accordance with any of the embodiments of the present disclosure.
Figure 18:
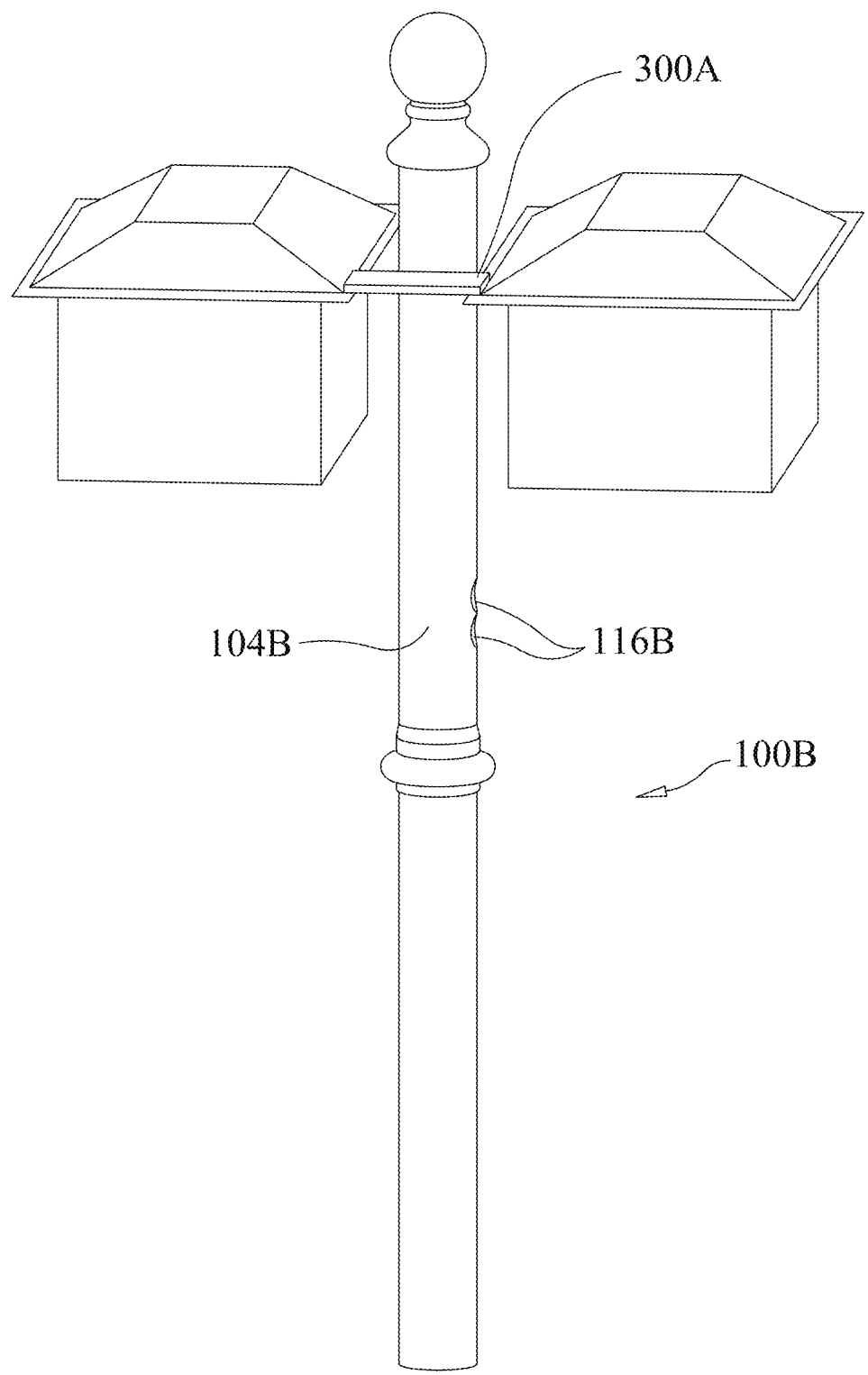
FIG. 18 is another view of the mailbox/mailbox pole non-limiting example seen in FIG. 16 looking at the mailbox from a different angle and illustrating that the one or more cameras disposed within the pole are not visible from several angles when looking at the mailbox.

FIG. 15, FIG. 16 and FIG. 18 illustrate a third, non-limiting, embodiment for the novel covert video camera housing and is generally designated as housing 100B. The primary difference between the first embodiment of FIG. 1 and the third embodiment, is that pole is an existing pole, similar to or the same as existing pole 50 described above for the second embodiment, whereas in the first embodiment a new pole/body member 104 is provided. For the third embodiment, body member 104B of existing pole 50 is able to be modified (i.e. able to have one or more openings 116B be created in body member 104B and a video camera 200 is able to be housed within body member 104B and aligned with opening 116B. With body member 104B of existing pole 50 modified to include one or more openings 116B, camera 200 is installed similar to or the same as described for the first embodiment and can also include a cap member, flexible rods, solar panel, etc. As seen in FIG. 16 0 FIG. 18 in one non-limiting embodiment, where multiple mailboxes or other objects are provided and associated with the pole and/or pole adaptor, a solar panel 300A can be rest upon and secured/mounted to or be positioned between and secured/mounted to the two mailboxes/objects by any known or later developed securement device or material. In one non-limiting embodiment, an adhesive, such as, a silicon adhesive, can be used for securing solar panel 300A to the mailboxes or other objects. An additional hole or opening (not seen) can be provided in the pole or pole adaptor (preferably behind solar paned 300A) to allow wiring to be run/provided from the solar panel to the camera(s) stored withing the pole or pole adaptor.

Features and components described for one embodiment are also considered to be available and/or used with any other described embodiment and are incorporated by reference for each embodiment. As such, the description of a component or part of the covert housing for one embodiment is considered incorporated by reference for the other embodiments description, where the same or similar component or part as appears or is used for the other embodiment(s).

For all embodiments, where a male/female fastener or mechanical connection is described or shown, it should be understood that the male and female portions shown or described can be reversed with the female portion located where the male portion is and the male portion located where the female portion is. Additionally, though the poles are shown in the drawings are circular in shape, such is not considered limiting, and the shape of the various poles or other objects that the cameras are covertly contained within are not considered limited to any specific shape or cross-sectional shape and can include various types of shapes, including, without limitation, circular, square, elliptical, rectangular, diamond, hexagonal, octagonal, etc. and all are considered within the scope of the disclosure.

The disclosure is not limited to any particular type of surveillance camera or electronic communication methods (wire or wireless) and all types of surveillance camera and various types of wired and wireless communication and data transmission technologies can be used and are considered within the scope of the disclosure. The operation, set up, use, data storage, data transmission, data retrieval, etc. (collectively "Camera Operation") for the surveillance is preferably not affected through use of the current disclosure devices and such known or later developed Camera Operation is considered incorporated by reference into this disclosure.

It should be understood that the exemplary embodiments described herein should be considered in a descriptive sense only and not for purposes of limitation. Where multiple embodiments are disclosed, descriptions of features or aspects within each embodiment should typically be considered as available for other similar features or aspects in other embodiments. While one or more embodiments have been described with reference to the figures, it is understood that various changes in form and details may be made therein without departing from their spirit and scope and such changes are considered within the scope of the disclosure.

All parts/components of the covert video camera housing and their locations, wiring, powering means, charging means, wireless communication means and technology; recording means, storage means, broadcasting means, mechanical and/or electrical communications between parts/components and/or devices, attachment or securement mechanisms, dimensions, values, ratings, shapes, colors, materials, etc. discussed above or shown in the figures, if any, are merely by way of example and are not considered limiting and other component(s) and their locations, wiring, powering means, charging means, wireless communication means and technology, recording means, storage means, broadcasting means, mechanical and/or electrical communications between parts/components and/or devices, attachment or securement mechanisms, dimensions, values, ratings, shapes, colors materials, etc. can be chosen and used and all are considered within the scope of the disclosure.

The benefits, advantages, solutions to problems, and any element(s) that may cause any benefit, advantage, or solution to occur or become more pronounced are not to be construed as a critical, required, or essential features or elements of any or all the future claims.

While the novel covert video camera housing has been described and disclosed in certain terms and has disclosed certain embodiments or modifications, persons skilled in the art who have acquainted themselves with the disclosure, will appreciate that it is not necessarily limited by such terms, nor to the specific embodiments and modification disclosed herein. Thus, a wide variety of alternatives, suggested by the teachings herein, can be practiced without departing from the spirit of the disclosure, and rights to such alternatives are particularly reserved and considered within the scope of the disclosure.

What is claimed is:

1. A pole adaptor for covertly housing at least one surveillance camera disposed within a camera housing such that a presence of the at least one surveillance camera and camera housing is not easily seen, comprising:
    an elongated body member having an open first end and an open second end and defining a passageway from the first end to the second end of the elongated body member, the body member adapted for securement to an externally accessible first end of an existing pole, the body member defining a first sidewall opening between the first end of the body member and the second end of the body member;
    a cap member secured to the first end of the body member, the cap member adapted for securing or suspending a first surveillance camera disposed within a first camera housing within the passageway of the body member and aligning a lens portion of the surveillance camera with the first sidewall opening in the body member when the cap member is secured to the first end of the body member to allow the first surveillance camera to record, stream or electronically transmit events happening in an area adjacent or around a location for the existing pole while the first surveillance camera and at least a majority of the first camera housing remain fully disposed within the body member;
    wherein the elongated body member and the cap member are both separate and independent of the first camera housing.

2. The pole adaptor of claim 1 further comprising a rod member having a first end and a second end, wherein a first end of the rod member secured to the cap member and the second end of the rod member adapted for securement to a first end of the first camera housing.

3. The pole adaptor of claim 2 wherein a length selected for the rod member suspends the first surveillance camera and the first camera housing within the passageway of the elongated body member and positions the lens portion of the first surveillance camera within the body member in alignment with the first sidewall opening defined by the body member and allows the first sidewall opening in the body member to be located further away from the first end of the body member.

4. The pole adaptor of claim 1 further comprising a solar panel secured to an outer top end of the cap member.

5. The pole adaptor of claim 1 wherein the cap member with the first surveillance camera and first camera housing directly or indirectly secured thereto is removably secured to the first end of the body member.

6. The pole adaptor of claim 1 wherein the existing pole is permanently fixed and the second end of the body member having a sleeve portion having an inner diameter slightly larger than an outer diameter at the first end of the fixed existing pole such that the first end of the fixed existing pole is received within the sleeve portion when securing the body member to the first end of the fixed existing pole.

7. The pole adaptor of claim 1 wherein the body member having a second sidewall opening; wherein where a second surveillance camera disposed within a second camera housing is secured to or suspended downward from a bottom portion of the first camera housing within the body member a lens portion of the second surveillance camera is aligned with the second sidewall opening in the body member when the cap member is secured to the first end of the body member to allow the second surveillance camera to record, stream or electronically transmit events happening in an area adjacent or around a location for the existing pole though at a different viewing angle from the first surveillance camera and while the second surveillance camera and at least a majority of the second camera housing remain fully disposed within the body member.

8. The pole adaptor of claim 7 wherein the second sidewall opening is located on the body member at a location opposite of a location of the first sidewall opening on the body member and the second sidewall opening is located at a location farther away from the first end of the body member as compared to the location of the first sidewall opening.

9. The pole adaptor of claim 1 wherein the existing pole serves as a light pole, mailbox pole, fence pole or flag pole.

10. A pole serving as a housing to covertly store at least one surveillance camera disposed within a camera housing such that a presence of the at least one surveillance camera and camera housing is not easily seen, comprising:
    an elongated body member having an externally accessible open first end and a second end and defining a passageway beginning at the first end of the body member, the body member adapted for securement within a ground area or to another object, the body member defining a first sidewall opening between the first end of the body member and the second end of the body member;

a cap member secured to the first end of the body member, the cap member adapted for securing or suspending a first surveillance camera disposed within a first camera housing within the passageway of the body member and aligning a lens portion of the surveillance camera with the first sidewall opening in the body member when the cap member is secured to the first end of the body member to allow the first surveillance camera to record, stream or electronically transmit events happening in an area adjacent or around a location where the pole is located while the first surveillance camera and at least a majority of the first camera housing remain fully disposed within the body member;

wherein the elongated body member and the cap member are both separate and independent of the first camera housing.

11. The pole of claim 10 further comprising a rod member having a first end and a second end, wherein a first end of the rod member secured to the cap member and the second end of the rod member adapted for securement to a first end of the first camera housing.

12. The pole of claim 11 wherein a length selected for the rod member suspends the first surveillance camera and the first camera housing within the passageway of the elongated body member and positions the lens portion of the first surveillance camera within the body member in alignment with the first sidewall opening defined by the body member and allows the first sidewall opening in the body member to be located further away from the first end of the body member.

13. The pole of claim 10 further comprising a solar panel secured to an outer top end of the cap member.

14. The pole of claim 10 wherein the cap member with the first surveillance camera and first camera housing directly or indirectly secured thereto is removably secured to the first end of the body member.

15. The pole of claim 10 wherein the second end of the body member adapted for permanent securement within an outdoor ground area.

16. The pole of claim 10 wherein the body member having a second sidewall opening; wherein where a second surveillance camera disposed within a second camera housing is secured to or suspended downward from a bottom portion of the first camera housing within the body member a lens portion of the second surveillance camera is aligned with the second sidewall opening in the body member when the cap member is secured to the first end of the body member to allow the second surveillance camera to record, stream or electronically transmit events happening in an area adjacent or around a location for the existing pole though at a different viewing angle from the first surveillance camera and while the second surveillance camera and at least a majority of the second camera housing remain fully disposed within the body member.

17. The pole of claim 16 wherein the second sidewall opening is located on the body member at a location opposite of a location of the first sidewall opening on the body member and the second sidewall opening is located at a location farther away from the first end of the body member as compared to the location of the first sidewall opening.

18. The pole of claim 10 wherein the pole also serves as a light pole, mailbox pole, fence pole or flag pole.

19. A method for converting an existing outdoor pole as a housing for covertly storing an operating surveillance camera, the surveillance camera disposed within a camera housing, the pole having a body member having an externally accessible open first end and a second end and provided with a cap member secured at the first end of the body member, comprising the steps:

a. creating at least one sidewall hole or opening in the body member between the first end of the body member and the second end of the body member; and b. positioning a first surveillance camera and at least a majority of a first camera housing that the first surveillance camera is disposed in within the body member and aligning a lens portion of the first surveillance camera with a first sidewall hole or opening of the at least one sidewall hole or opening in the body member to allow the first surveillance camera to record events occurring in an area adjacent or around a location for the existing outdoor pole while the first surveillance camera and at least a majority of the first camera housing remain fully within the body member;

wherein the body member of the pole and the cap member are both separate and independent of the first camera housing.

20. The method for converting an existing outdoor pole of claim 19 wherein step b. comprising securing the first surveillance camera and the first camera housing to or suspending the first surveillance camera and the first camera housing from an inner surface area of the cap member and securing the cap member to the body member of the pole at the first end of the body member of the pole.

21. The method for converting an existing outdoor pole of claim 19 wherein the existing pole serves as a light pole, mailbox pole, fence pole or flag pole.

22. The method for converting an existing outdoor pole of claim 19 wherein step b. comprising (i) suspending a rod member having a first end and a second end at the first end of the rod member from an inner surface of the cap member and (ii) securing the second end of the rod to a first end of the first camera housing.

* * * * *